S. H. COPE.
ROAD VEHICLE WHEEL.
APPLICATION FILED MAR. 2, 1916.
1,260,146.
Patented Mar. 19, 1918.
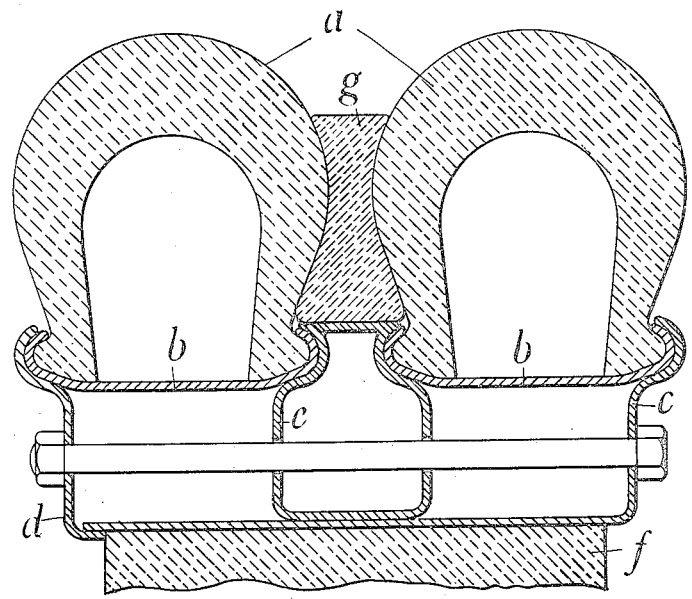
INVENTOR
Sidney Halder Cope
BY
ATTORNEYS

UNITED STATES PATENT OFFICE.

SIDNEY HALBERT COPE, OF BIRMINGHAM, ENGLAND, ASSIGNOR TO THE WARLAND DUAL RIM COMPANY LIMITED, OF BIRMINGHAM, ENGLAND.

ROAD-VEHICLE WHEEL.

1,260,146.  Specification of Letters Patent.  Patented Mar. 19, 1918.

Application filed March 2, 1916. Serial No. 81,649.

*To all whom it may concern:*

Be it known that I, SIDNEY HALBERT COPE, a subject of the King of Great Britain and Ireland, residing at York Mills, Witton Lane, Aston, in the city of Birmingham, England, have invented certain new and useful Improvements Relating to Road-Vehicle Wheels, of which the following is a specification.

This invention relates to road vehicle wheels fitted with twin pneumatic tires, that is to say, a pair of tires which are mounted with the one alongside the other on the rim of the wheel.

Ordinarily there is a small space between the two tires and it is found that on rough roads stones become lodged within this space and produce a destructive effect upon the tire surfaces.

The object of the present invention is to provide convenient means for preventing the lodgment of stones between twin tires and thereby avoiding the trouble above mentioned.

The invention comprises the employment between the tires, of a detachable rubber filling ring of smaller outside diameter than the tires, which ring has concave sides and is shaped to fit closely between the tire surfaces.

The accompanying diagram is a cross section of a road vehicle wheel fitted with twin tires having this invention applied thereto.

The tires (of which the outer covers only are shown) are indicated by $a$. These are mounted on detachable metal rims $b$ which are carried by fixed and detachable flanges $c$ and $d$ respectively and a removable central flange $e$, all mounted on the usual felly $f$. A rubber ring $g$ which is preferably reinforced by canvas or metal is made of suitable internal diameter to fit over and rest upon the central flange $e$ between the two detachable tire rims $c$ and $d$. The outside diameter of the ring $g$ is smaller than that of the tires so that the periphery of the ring does not come into contact with the road. The sides of the ring are made to a concave section which corresponds to the contours of those parts of the tire surfaces between which the ring lies when in service. Consequently the thickness of the ring is smaller at the middle than at the inner and outer peripheries. When the tires are inflated they secure the ring between them and prevent any possibility of accidental detachment. Due to the tight fitting of the ring between the tires it is impossible for stones to become wedged between the tires and there produce a destructive effect upon the tire surfaces.

I do not limit myself to details of construction and combination of parts, save as indicated in the accompanying claim.

Having thus described my invention what I claim as new and desire to secure by Letters Patent is:—

In road vehicle wheels including a felly fitted with twin pneumatic tires having convex projections on their inner faces and spaced apart, of a rubber ring detachably mounted on said felly and between said convex portions, said ring having its sides concaved and mating with the convex portions of the pneumatic tires, the outer circumference of said rubber ring lying well within the circumference of the said tires whereby when the said tires are deflated the said rubber ring will be held in place on the felly.

In testimony whereof I have signed my name to this specification.

SIDNEY HALBERT COPE.